Dec. 26, 1944.　　　　R. S. WILLARD　　　　2,365,924
PROCESS OF PRESERVING FRESH FOOD PRODUCTS
Filed Nov. 21, 1941
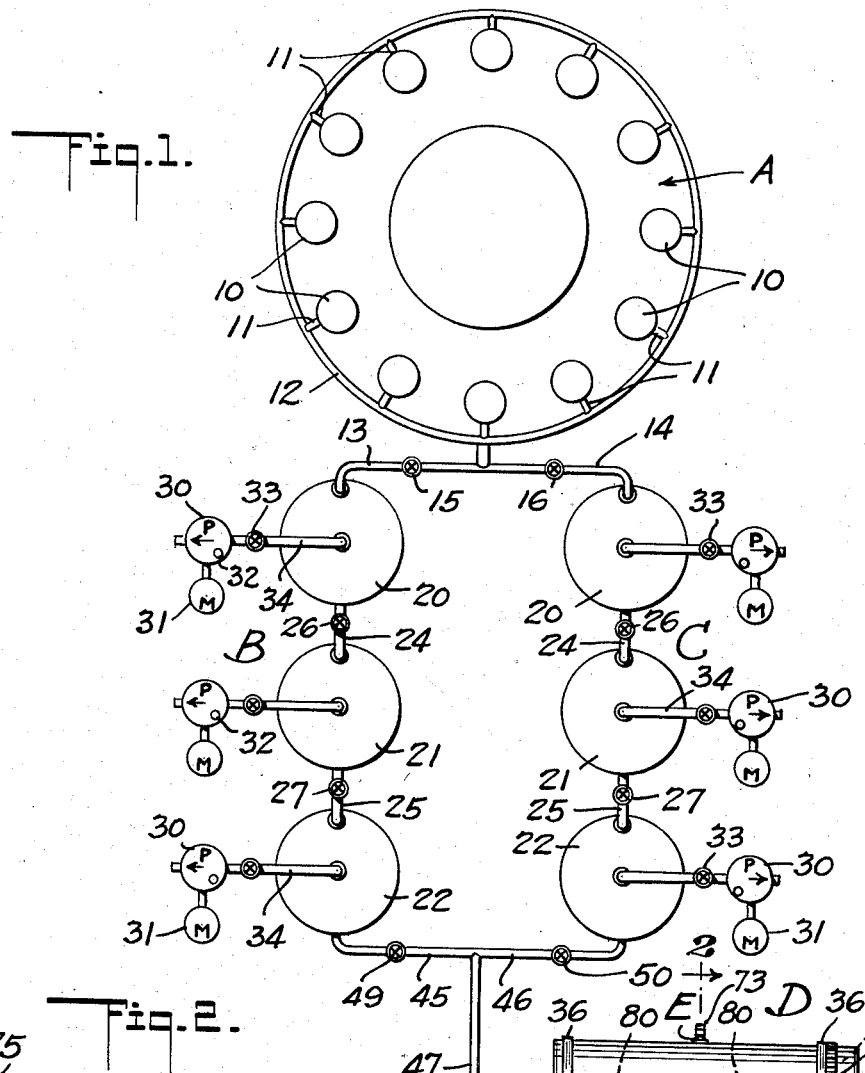
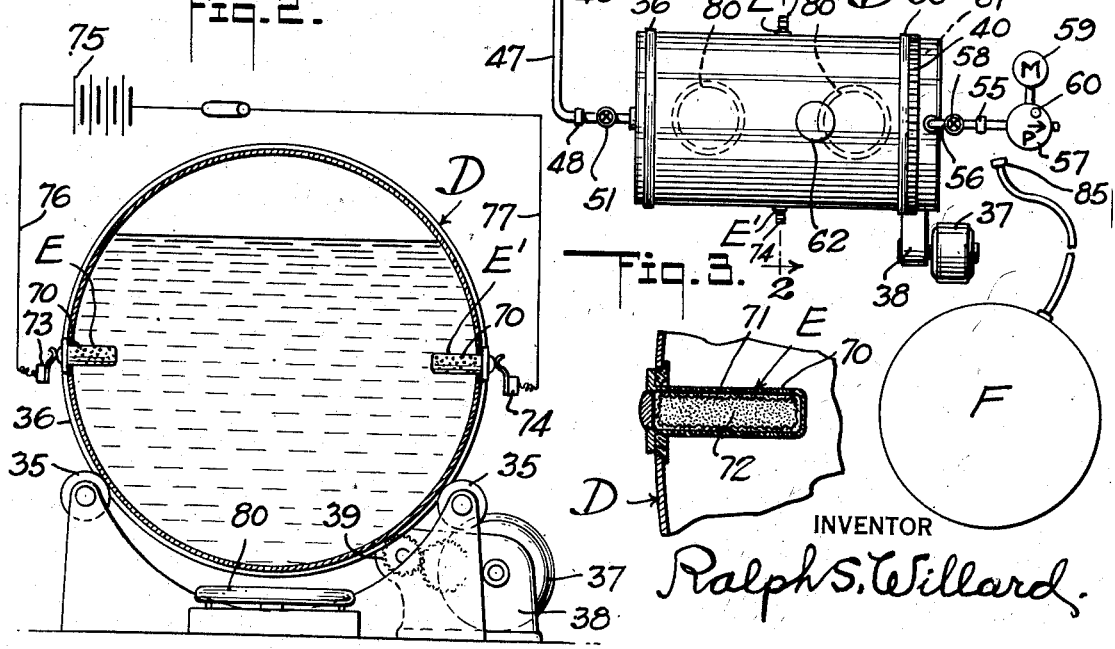
INVENTOR
*Ralph S. Willard*

UNITED STATES PATENT OFFICE 2,365,924

PROCESS OF PRESERVING FRESH FOOD PRODUCTS

Ralph S. Willard, Glendale, Calif., assignor to Sunlite Fruit Juices Ltd., Hollywood, Calif., a corporation of California Application November 21, 1941, Serial No. 420,003

8 Claims. (Cl. 99—155)

This invention relates generally to the art of preserving food products and more particularly to the preservation of liquid foods in cans, glass and other containers.

An object of the invention is to provide a process of and apparatus for preserving liquid foods and beverages such as the juices of citrus fruits, in a manner to prevent oxidation, reduction, or any form of adverse chemical action resulting therefrom, which would cause loss of natural flavor, vitamin content, or other deterioration of the juices once they are extracted from the fruit, all to the end of enabling citrus fruit juice to be obtained in cans, glass, cartons and other containers with its natural flavor and taste unimpaired, and which is sufficiently stable to remain palatable in a properly sealed container for a period of years within which the contents would ordinarily be consumed by a normal turnover of such products.

Another object of the invention is to provide a process and apparatus for preserving fresh fruit juices and other liquids, which can be carried out in a continuous operation suitable for large scale commercial production enabling a superior product to be inexpensively produced and marketed at a low cost.

With these and other objects in view, the invention resides in the steps of the process and in the combinations and arrangements of the elements of the apparatus as set forth in the following specification and particularly pointed out in the appended claims.

In the accompanying drawing,

Figure 1 is a schematic plan view of one form of apparatus embodying this invention, by which the process thereof can be carried out;

Figure 2 is an enlarged vertical transverse sectional view taken on the line 2—2 of Figure 1;

Figure 3 is a detail sectional view of a typical electrode embodied in the apparatus.

The invention in its broad aspect and in one of its many uses, subjects fresh, ripe citrus juice such as orange juice, immediately after being squeezed from the fruit, to the action of a vacuum in a closed receptacle, it being understood that in large scale production, a number of receptacles in a plurality of units are provided to receive the juice from a juice extracting station for continuous operation, all to be later described in detail.

Following this vacuumizing step, the juice thus treated is maintained under vacuum and mixed with a predetermined quantity of pectic acid and its enzymes such as pectase and its coenzymes, in a closed vacuumizing receptacle which is agitated preferably by slow rotation, during which the contents are subjected to the action of an electric current passing through the juice between catalytic electrodes, to free suspended gases from the juice and stabilize the pH value of the juice so as to prevent further enzymatic change or action.

During the agitation and electrical treatment of the juice, the juice can be heated while in vacuum, to a pasteurizing temperature noninjurious to the juice, or can be delivered under vacuum to a vacuum canning or bottling machine and similarly treated by heat following the canning or bottling operation.

In carrying the invention into practice for the treatment and canning of orange juice as an example, reference will be had to the accompanying drawing illustrating one embodiment of apparatus which comprises a juice extracting unit A equipped with a number of juice extracting machines 10 to which half sections of fruit are applied by operators. The pulp is separated from the juice at the machines, the juice draining from the latter through pipes 11 into a common delivery conduit 12 connected by pipes 13 and 14 to a plurality of vacuumizing units B and C respectively, there being suitable valves 15 and 16 in the pipes 13 and 14 respectively, to control the flow of juice to one vacuumizing unit or the other as desired.

Each of the units B and C is composed of a series of vacuum tanks or chambers designated by 20, 21 and 22 arranged at successively lower levels for the draining of juice from one tank to the next. The pipes 13 and 14 are connected in series by pipes 24 and 25 leading from the bottom of one tank to the top of the next tank and having flow control valves 26 and 27 respectively.

The tanks of each vacuumizing unit are adapted to be placed under different stages of vacuum, increasing from the tank 20 to the tank 22, all for the purpose of enabling a continuous vacuumizing process to be carried on as the juice is conducted step by step from one tank to the next, and from the last tank of each series to a vacuum receptacle or drum D for further treatment as will be later described in detail.

Each of the tanks 20, 21 and 22 of the units B and C, is connected to a separate vacuum pump 30 driven by a suitable motor 31 and equipped with the usual vacuum gage 32 and shut-off valve 33 in the vacuum pipe 34 leading to the top of the respective tank, all to the end of enabling a predetermined vacuum to be established and maintained in each tank.

The receptacle D is a horizontally disposed cylinder and is mounted for rotation about a fixed horizontal axis by means of rollers 35 (Figure 2) riding on circular tracks 36 fixed to the receptacle adjacent its ends. The receptacle D is adapted to be rotated at a relatively slow speed (15 to 20 R. P. M.) by an electric motor 37 operatively connected by suitable reduction gearing 38 and a driving pinion 39, to a circular rack 40 secured to the receptacle.

The last tanks 22 of the vacuumizing units B and C are connected by pipes 45 and 46 respectively, to a pipe 47 detachably connected by a suitable coupling 48 to one end of the receptacle D. Valves 49 and 50 are provided in the pipes 45 and 46 respectively, and a valve 51 is provided in the pipe 47 between the coupling 48 and the receptacle.

To the other end of the receptacle D is detachably connected by a coupling 55, a vacuum pipe 56 having a valve 57 arranged between the coupling 55 and the receptacle. The pipe 56 leads to a suitable vacuum pump 58 driven by an electric motor 59 and equipped with the usual vacuum gage 60, all to the end of enabling a vacuum as high or higher than that in the last tanks 22 to be established and maintained in the receptacle D, which latter, it will be noted, is also provided with a suitable filtering screen 61 and with an access opening sealed with a removable hatch or closure 62.

The receptacle D is further provided with one or more of each of electrodes E and E' supported at diametrically opposed points along the length of the receptacle, and projecting into the receptacle to define a current gap in the latter between each pair of electrodes.

The electrodes E and E' are of identical construction, and each is composed of a perforated tube 70 of silver or other good conductor of electricity, which contains a fabric bag 71 filled with silver, platinum, nickel, or any other water insoluble metallic oxide 72. The electrodes are adapted to have simultaneous wiping engagement with stationary contacts 73 and 74 during each revolution of the receptacle D, for co-action with the contacts in completing an electrical circuit from a suitable source of current supply 75 through conductors 76 and 77 connected to opposite sides of the current source and to the respective contacts, it being understood that the E. M. F. is sufficient for the current to jump the gap through the liquid contents of the receptacle.

Suitable burners 80 or other form of heat source, are provided for the purpose of rapidly supplying pasteurizing heat to the receptacle D, or in lieu thereof, this heating step can take place after the canning operation by subjecting the sealed cans to pasteurizing heat.

Any suitable conventional type of vacuum canning or bottling apparatus can be employed in conjunction with the apparatus above described, and is designated generally at F. A suitable detachable coupling connection 85 is provided between the pipe 56 of the receptacle D and the apparatus F.

The method embodied in this invention as practiced in conjunction with the apparatus above described is as follows:

Fresh, ripe oranges thoroughly cleaned and divided into halves suitable for juicing, are delivered immediately after dividing, to the extracting unit A by a conveyor or other means (not shown), and are applied by operators to the juice extracting machines 10, from which juice is first delivered to the tank 20 of the vacuumizing unit B, which tank, when filled to capacity, is closed off from the pipe 13 by means of the valve 15.

A predetermined vacuum, say five inches, is established by the respective vacuum pump 30 in the tank 20, during which interval, juice from the extracting unit A is delivered to the tank 20 of the vacuumizing unit C.

Successively higher vacuums of approximately ten and fifteen inches, are established in the tanks 21 and 22 of the units B and C, to which tanks the juice in the tanks 20 is transferred step by step as new juice is supplied to the tanks 20 from the extracting unit A for the initial vacuumizing, all by proper manipulation of the valves 15, 16, 26, 27, 49 and 50, and suitable operation of the several vacuum pumps 30.

With the receptacle D at rest and supplied with a quantity of pectase preferably although not necessarily in the form of unripe oranges suitably divided and in an approximate quantity by weight, of from 30 to 60 grams per gallon of juice capacity of the receptacle, operation of the pump 57 is effected to establish a vacuum in the receptacle slightly higher than that in the tanks 22 from which latter their contents are now transferred. This operation is continued until the receptacle is supplied with its intended quantity of juice, following which the receptacle is sealed by closing the valves 51 and 57, and is disconnected from the pipes 47 and 56 at the couplings 48 and 55 so that the receptacle is now free to be rotated.

The motor 37 is now started to effect rotation of the receptacle, during which operation, the electrical circuit through the electrodes E and E' is intermittently completed to subject the juice to the shocking effect of the electric current which increases the succinic acid content, thus diminishing enzymatic action.

During this combined agitation and electrical treatment of the juice, the latter is heated by the burners 80 to rapidly raise the temperature of the juice to from fifty to sixty degrees centigrade, depending upon the analysis of the juice, particularly as to the amount of pectic acid, pectin and pectase enzyme present in the juice.

When the juice has been heated to the predetermined maximum temperature which must be accomplished in a relatively short time (15 to 30 minutes for example), to obviate any adverse chemical change, rotation of the receptacle is stopped, and the pipe 56 is detached from the connection 55 and then attached by means of the connection 85 to the vacuum canning apparatus F. The valve 57 is now opened to establish communication between the receptacle D and the apparatus F for the flow of juice to the latter and canning of the juice. Immediately following the canning operation, the canned juice is rapidly cooled to a relatively low temperature which for example, can be about ten degrees centigrade.

From the foregoing description it will be manifest that by means of the process embodied in this invention, the juice is removed from the destructive action of atmospheric air immediately following extraction from the fruit, and is maintained under vacuum to remove any air present in a free state, such as nitrogen and oxygen.

Furthermore, that by subjecting the juice to increasingly higher stages of vacuum, the ability of enzymes, bacteria, or citrus fungi, to introduce any metabolic, catabolic, or anabolic activities is completely removed, it being understood that citrus fruits carry bacteria, fungi, or even parasites plus enzymes which might promote various changes detrimental to the product.

The addition of sections of green fruit to the juice in the receptacle D is merely one way of adding pectic acid and its enzyme so as to establish a predetermined hydrogen ion concentration upon a certain lapse of time. Regardless of the particular kind of citrus juice to be canned by this process, the juice should have a certain hydrogen ion concentration. The fruit should be selected as to taste, and its pH value kept as low as possible. It is well known that citrus juice is subject to destructive actions from the following sources:

Bacteria—as a result of handling during the juice extracting operation;
Yeasts and fungi—from its growth and heredity;
Enzymes—because of its being the result of growth.

The juice has more than one enzyme as one enzyme does not work alone. It is known that any one enzyme has several coenzymes. Enzymes of citus fruit have their optimum activity for periods of time at levels higher than pH 4. Practically no enzymatic activity exists below 4.0 or above 7.0.

The process of ripening citrus fruit is merely an act of growth plus enzyme activity. The growth of citrus fruits, until fully ripened, consists of the formation of pectic acid. This growth process and final ripening occurs because pectic acid enzymes such as pectase etc. break down pectic acid by the process of growth into pectin and other components such as dextrose, citric acid, etc. In the process embodied in this invention, the addition of pectic acid to the juice during its treatment in the receptacle D causes further conversion comparable to ripening.

Because of rapid action under certain conditions, enzymes from navel oranges give a pH far above 5 and below 7. After citrus fruit has been picked, the natural ripening process is accelerated.

By rotational movement of the receptacle D, hydrogen, and in fact all gases suspended in the juice are freed therefrom, and a ripening process takes place by a form of digestive action. The addition of pectic acid and its enzyme (green fruit plus certain mixed sour fruit), lowers the pH value of the juice, and the final electric shocking treatment of the juice between the catalyzing electrodes E and E' stabilizes the pH, thus positively preventing any further enzymatic change or action, provided of course that the juice is immediately sealed in a vacuumized container as is accomplished by the vacuum canning machine F.

By terminating bacterial activity in vacuum, and pasteurizing the juice during this stage of the process, a lower temperature for pasteurization can be employed than would be required to pasteurize in the presence of air, to the end of preventing any change in flavor of the juice by the pasteurizing operation. As there is no chance for bacterial survival after the electrical treatment between catalyzers and pasteurization, any bacteria or fungi present in the juice naturally or through contamination, can no longer live because of the lack of enzymatic activity, lack of gas such as nitrogen or oxygen. Therefore, unless the can is unsealed, the contents will remain unchanged indefinitely.

It is to be understood that although the vacuum canning of the juice is necessary to maintain the juice unchanged indefinitely, the juice is sufficiently stabilized to remain palatable and practically unchanged for several days if merely sealed in sterilized containers and kept in a refrigerated state without utilizing a vacuum. Thus it will be clear that in cases where the product will be consumed in a short time after processing, the vacuum canning can be dispensed with.

It is also to be understood that the step of supplying pectic acid to the juice is primarily included for the purpose of digestion. Similar digestion will take place, not so efficiently however, if the juice is maintained under the vacuum for an extended period of time until predigestion is effected by the enzymes present in the juice. It is desirable in practice to add pectic acid in order to accelerate the process.

Thus it will be clear that a reduction in enzymatic activity by lowering the pH value of the juice will take place without the addition of pectic acid, if the vacuumizing step is prolonged.

From the foregoing description it will be manifest that in its broadest aspect the invention contemplates the preservation or stabilization of vitamin C by rendering it more resistant to oxidation, and that the important use of the invention for the preservation of citrus fruit juice is one of the many uses to which the invention can be adapted. Therefore, the claims are to be broadly construed in the light of this broad disclosure.

As a result of the process embodied in this invention a reaction takes place as follows:

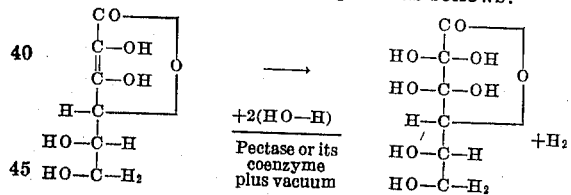

I claim:

1. The process of preserving vitamin C which comprises: subjecting to the action of a vacuum a natural substance containing vitamin C; heating and agitating the substance while vacuumized; and exposing the vacuumized substance to the catalytic action of a water-insoluble metallic oxide while subjecting the catalyst and substance to an electric current until the structure of the vitamin C is changed as follows:

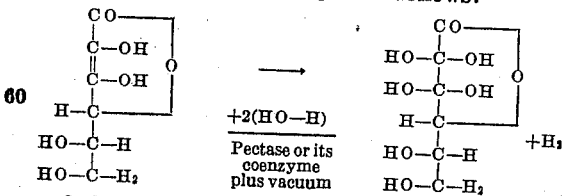

2. The process of preserving fruit juices and other food products containing vitamin C which comprises: placing the juice under a vacuum upon extraction from the fruit to prevent such oxidation or reduction as would adversely affect the natural flavor of the juice; agitating the juice while being heated, to free suspended gases from the juice; exposing the heated juice to catalytic action of a water-insoluble metallic oxide while passing an electric current through the juice to ionize same and stabilize the pH value and vitamin C content of the juice; subjecting the juice to the minimum heat necessary to effect pasteurization of the juice while vacuumized; and cooling the juice.

3. The process of preserving fruit juices and other food products containing vitamin C which comprises: placing the juice under a vacuum a sufficiently short time following extraction of the juice from the fruit to retain the natural flavor thereof; agitating the juice while being heated, to free suspended gases from the juice; exposing the heated juice to catalytic action of a water-insoluble metallic oxide while intermittently passing an electric current through the juice to ionize same and stabilize the pH value and vitamin C content of the juice; subjecting the juice to the minimum heat necessary to effect pasteurization of the juice while vacuumized; and cooling the juice.

4. The process of preserving fruit juices and other food products containing vitamin C which comprises: placing the juice under successively higher stages of vacuum a sufficiently short time following extraction of the juice from the fruit to retain the natural flavor thereof; agitating the juice while being heated, to free suspended gases from the juice; exposing the heated juice to catalytic action of a water-insoluble metallic oxide while passing an electric current therethrough into the juice to ionize same and stabilize the pH value and vitamin C content of the juice; subjecting the juice to the minimum heat necessary to effect pasteurization of the juice while vacuumized; and cooling the juice.

5. The process of preserving fruit juices and other products containing vitamin C which comprises: placing the juice under a vacuum a sufficiently short time following extraction of the juice from the fruit to retain the natural flavor thereof; adjusting the pH value of the juice by adding sufficient pectic acid to obtain a pH value between approximately 4.0 and 7.0; agitating the juice while being heated, so as to distribute the pectic acid in the juice and free suspended gases therefrom; ionizing the heated and agitated juice by exposing same to catalytic action of a water-insoluble metallic oxide while passing an electric current therethrough to stabilize the pH value and vitamin C content of the juice; subjecting the juice to the minimum heat necessary to effect pasteurization of the juice while vacuumized; and cooling the juice.

6. The process of preserving fruit juices and other food products containing vitamin C which comprises: placing the juice under a vacuum upon extraction from the fruit; agitating the juice while heated, so as to free the juice of suspended gases; and exposing the heated and agitated juice to catalytic action of a water-insoluble metallic oxide while passing an electric current therethrough into the juice to complete the reaction and stabilize the juice without appreciably lowering its vitamin C content.

7. The process of preserving fruit juices and other food products containing vitamin C which comprises: placing the juice under a vacuum upon extraction of the juice from the fruit; agitating the juice while heated, so as to free same of suspended gases; and exposing the heated and agitated juice to catalytic action of a water-insoluble metallic oxide while intermittently passing an electric current therethrough to complete the reaction and stabilize the juice without appreciably lowering its vitamin C content.

8. In the process of preserving liquid food substances containing vitamin C, the steps of: agitating and heating the substance in a state of vacuum; and exposing the heated and agitated substance to catalytic action of a water-insoluble metallic oxide while passing an electric current therethrough into the substance so as to ionize same and stabilize the pH value and vitamin C content of the substance.

RALPH S. WILLARD.